US010439994B2

(12) United States Patent
Rhyu et al.

(10) Patent No.: US 10,439,994 B2
(45) Date of Patent: Oct. 8, 2019

(54) METHOD AND DEVICE FOR ENCRYPTING AND DECRYPTING MULTIMEDIA CONTENT

(71) Applicant: Samsung Electronics Co., Ltd., Suwon-si, Gyeonggi-do (KR)

(72) Inventors: Sung-Ryeul Rhyu, Yongin-si (KR); Eric Yip, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 123 days.

(21) Appl. No.: 15/324,089

(22) PCT Filed: Jul. 13, 2015

(86) PCT No.: PCT/KR2015/007251
§ 371 (c)(1),
(2) Date: Jan. 5, 2017

(87) PCT Pub. No.: WO2016/010318
PCT Pub. Date: Jan. 21, 2016

(65) Prior Publication Data
US 2017/0201497 A1    Jul. 13, 2017

(30) Foreign Application Priority Data
Jul. 15, 2014   (KR) ........................ 10-2014-0089234

(51) Int. Cl.
*H04L 29/06* (2006.01)
*G06F 21/62* (2013.01)
(Continued)

(52) U.S. Cl.
CPC ...... *H04L 63/0428* (2013.01); *G06F 21/6209* (2013.01); *H04N 21/2347* (2013.01);
(Continued)

(58) Field of Classification Search
None
See application file for complete search history.

(56) References Cited

U.S. PATENT DOCUMENTS

2005/0123136 A1* 6/2005 Shin ................. G11B 20/00086
380/217
2006/0048235 A1   3/2006 Rose et al.
(Continued)

FOREIGN PATENT DOCUMENTS

JP         5261402 B2     8/2013
KR   10-2009-0000228 A    1/2009
(Continued)

OTHER PUBLICATIONS

Illustrative Design Using New ISOBMFF Elements, Forensic Marking Framework for the ISOBMFF, pp. 1-14.

*Primary Examiner* — Andrew J Steinle
(74) *Attorney, Agent, or Firm* — Jefferson IP Law, LLP

(57) ABSTRACT

The present disclosure relates to a 5th-Generation (5G) or pre-5G communication system to be provided to support a higher data rate than a 4th-Generation (4G) communication system like Long Term Evolution (LTE). The present invention provides a method for encrypting a multimedia content comprising: encrypting multimedia contents including a plurality of variants and a plurality of samples; and transmitting the encrypted multimedia contents, wherein the plurality of variants correspond to the samples included in the multimedia contents, respectively, and are configured with reference to a predetermined number of samples, and each of the plurality of variants is configured with reference to a combination of different samples.

8 Claims, 11 Drawing Sheets

(51) Int. Cl.
  *H04N 21/2347*  (2011.01)
  *H04W 12/02*  (2009.01)
  *H04W 12/12*  (2009.01)
  *H04N 21/4405*  (2011.01)
  *H04N 21/442*  (2011.01)
  *H04N 21/61*  (2011.01)
  *H04N 21/8355*  (2011.01)
  *H04W 12/00*  (2009.01)
  *H04W 84/04*  (2009.01)

(52) U.S. Cl.
  CPC ... *H04N 21/4405* (2013.01); *H04N 21/44236* (2013.01); *H04N 21/6131* (2013.01); *H04N 21/8355* (2013.01); *H04W 12/001* (2019.01); *H04W 12/02* (2013.01); *H04W 12/12* (2013.01); *G06F 2212/402* (2013.01); *H04L 63/1425* (2013.01); *H04W 84/042* (2013.01)

(56) References Cited

U.S. PATENT DOCUMENTS

| | | | |
|---|---|---|---|
| 2008/0175313 A1 | 7/2008 | Sinclair et al. | |
| 2008/0189546 A1 | 8/2008 | Yoon | |
| 2008/0192936 A1* | 8/2008 | Bellwood | H04N 5/913 380/277 |
| 2013/0061287 A1* | 3/2013 | Kang | G06F 21/73 726/3 |
| 2013/0227604 A1 | 8/2013 | Shields et al. | |

FOREIGN PATENT DOCUMENTS

| | | |
|---|---|---|
| KR | 10-2010-0029279 A | 3/2010 |
| KR | 10-1244308 B1 | 3/2013 |
| KR | 10-1286645 B1 | 7/2013 |

\* cited by examiner

METHOD AND DEVICE FOR ENCRYPTING AND DECRYPTING MULTIMEDIA CONTENT

CROSS-REFERENCE TO RELATED APPLICATION(S)

This application is a U.S. National Stage application under 35 U.S.C. § 371 of an International application filed on Jul. 13, 2015 and assigned application number PCT/KR2015/007251, which claimed the benefit of a Korean patent application filed on Jul. 15, 2014 in the Korean Intellectual Property Office and assigned Serial number 10-2014-0089234, the entire disclosure of which is hereby incorporated by reference.

TECHNICAL FIELD

The present disclosure relates to a method and apparatus for encrypting and decrypting multimedia content.

BACKGROUND ART

To satisfy demands for wireless data traffic having increased since commercialization of 4th-Generation (4G) communication systems, efforts have been made to develop improved 5th-Generation (5G) communication systems or pre-5G communication systems. For this reason, the 5G communication system or the pre-5G communication system is also called a beyond-4G-network communication system or a post-long term evolution (LTE) system.

To achieve a high data rate, implementation of the 5G communication system in an ultra-high frequency (mm-Wave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud Radio Access Network (RAN), an ultra-dense network, a Device to Device (D2D) communication, a wireless backhaul, a moving network, cooperative communication, Coordinated Multi-Points (CoMPs), and interference cancellation have been developed.

In the 5G system, Advanced Coding Modulation (ACM) schemes including hybrid Frequency-Shift Keying (FSK) and Quadrature Amplitude Modulation (QAM) Modulation (FQAM) and Sliding Window Superposition Coding (SWSC), and advanced access schemes including Filter Bank Multi Carrier (FBMC), Non-Orthogonal Multiple Access (NOMA), and Sparse Code Multiple Access (SCMA) have been developed.

Meanwhile, a communication system is continuously evolving to provide various services to users, and representative service types are a broadcast service and a personal data service.

The broadcast service means a service provided over the wireless Internet, and information related to the broadcast service includes high-speed large-volume information. The personal data service means a service provided to a specific user, and security is important to the personal data service, because personal information may leak when the service is provided.

However, at present, there is no way to fundamentally prevent and solve information leakage and thus research on the way is needed.

DETAILED DESCRIPTION OF THE INVENTION

Technical Problem

The present disclosure proposes a method and apparatus for configuring multimedia content to facilitate detection of falsification of the multimedia content.

The present disclosure proposes a method and apparatus for encrypting multimedia content which is configured to facilitate detection of falsification of the multimedia content.

The present disclosure also proposes a method and apparatus for detecting a subject that falsifies multimedia content if the multimedia content is falsified.

Technical Solution

A method for encrypting multimedia content proposed in an embodiment of the present disclosure includes encrypting multimedia content including a plurality of variants and a plurality of samples and transmitting the encrypted multimedia content, in which the plurality of variants correspond to samples in included the multimedia content, respectively, and are configured with reference to a predetermined number of samples, and each of the plurality of variants is configured with reference to a combination of different samples.

A method for decrypting multimedia content proposed in an embodiment of the present disclosure includes receiving encrypted multimedia content including a plurality of variants and a plurality of samples, detecting and decrypting one of the plurality of variants, comparing a picture related to the decrypted variant with an original picture before being encrypted, and detecting that the multimedia content is falsified, if the picture related to the decrypted variant is different from the original picture, in which the plurality of variants correspond to samples included in the encrypted multimedia content, respectively, and are configured with reference to a predetermined number of samples, and each of the plurality of variants is configured with reference to a combination of different samples.

An apparatus for encrypting multimedia content proposed in an embodiment of the present disclosure includes a controller configured to encrypt multimedia content including a plurality of variants and a plurality of samples and a transceiver configured to transmit the encrypted multimedia content, in which the plurality of variants correspond to samples in included the multimedia content, respectively, and are configured with reference to a predetermined number of samples, and each of the plurality of variants is configured with reference to a combination of different samples.

An apparatus for decrypting multimedia content proposed in an embodiment of the present disclosure includes a transceiver configured to receive encrypted multimedia content including a plurality of variants and a plurality of samples and a controller configured to detect and decrypt one of the plurality of variants, to compare a picture related to the decrypted variant with an original picture before being encrypted, and to detect that the multimedia content is falsified, if the picture related to the decrypted variant is different from the original picture, in which the plurality of variants correspond to samples included in the encrypted multimedia content, respectively, and are configured with reference to a predetermined number of samples, and each of the plurality of variants is configured with reference to a combination of different samples.

Other aspects, advantages, and key features of the present disclosure will be processed together with the attached drawings, and will be apparent to those of ordinary skill in the art from the following detailed description disclosing various embodiments of the present disclosure.

Before undertaking the DETAILED DESCRIPTION OF THE INVENTION below, it may be advantageous to set forth definitions of certain words and phrases used throughout this patent document.

The terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation, and such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Advantageous Effects

The present disclosure proposes a method for configuring multimedia content including variants configured with reference to different samples, thereby easily detecting falsification of the multimedia content and easily detecting a subject that falsifies the multimedia content.

MODE FOR CARRYING OUT THE INVENTION

Figure 1:
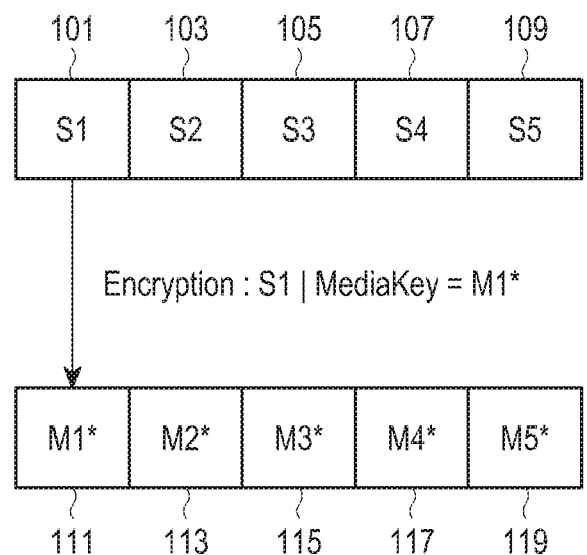
FIG. 1 illustrates an example of encryption of plaintext multimedia content.

Hereinafter, embodiments of the present disclosure will be described in detail with reference to the attached drawings. Moreover, a detailed description of well-known functions or elements associated with the present disclosure will be omitted if it unnecessarily obscures the subject matter of the present disclosure. Further, the terminologies to be described below are defined in consideration of functions in the present disclosure and may vary depending on a user's or operator's intention or practice. Therefore, the definitions should be made based on the contents throughout the entire description of the present disclosure.

Various changes may be made to the present disclosure and the present disclosure may have various embodiments which will be described in detail with reference to the drawings. However, the embodiments according to the concept of the present disclosure are not construed as limited to specified disclosures, and include all changes, equivalents, or substitutes that do not depart from the spirit and technical scope of the present disclosure.

It is to be understood that the singular forms "a," "an," and "the" include plural referents unless the context clearly dictates otherwise. Thus, for example, reference to "a component surface" includes reference to one or more of such surfaces.

Although the terms such as "first" and "second" used in the various exemplary embodiments of the present disclosure may modify various elements of the various exemplary embodiments, these terms do not limit the corresponding elements. These terms may be used for the purpose of distinguishing one element from another element. For example, a first element may be named as a second element without departing from the right scope of the various exemplary embodiments of the present disclosure, and similarly, a second element may be named as a first element. The term "and/or" includes a combination of a plurality of related provided items or any one of the plurality of related provided items.

The terms used in the various exemplary embodiments of the present disclosure are for the purpose of describing particular exemplary embodiments only and are not intended to be limiting. The singular forms are intended to include the plural forms as well, unless the context clearly indicates otherwise. The term "include" or "has" used in the exemplary embodiments of the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

All of the terms used herein including technical or scientific terms have the same meanings as those generally understood by an ordinary skilled person in the related art unless they are defined other. The terms defined in a generally used dictionary should be interpreted as having the same meanings as the contextual meanings of the relevant technology and should not be interpreted as having ideal or exaggerated meanings unless they are clearly defined in the various exemplary embodiments.

An electronic device according to various embodiments of the present disclosure may be a device including a communication function. For example, an electronic device may include a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, and a wearable device (e.g., a head-mounted device (HMD), electronic clothing, an electronic bracelet, an electronic necklace, an electronic appcessory, an electronic tattoo, or a smart watch.

According to some embodiments, the electronic device may be a smart home appliance having a communication function. For example, the smart home appliance may include a TV, a digital video disk (DVD) player, audio equipment, a refrigerator, an air conditioner, a vacuum cleaner, an oven, a microwave oven, a washer, a drier, an air cleaner, a set-top box, a TV box (e.g., HomeSync™ of SAMSUNG, TV™ of Apple, or TV™ of GOOGLE), a game console, an electronic dictionary, a camcorder, and an electronic frame. Ac cording to various embodiments of the present disclosure, the electronic device may include various medical equipment (for example, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, an industrial or home robot, and so forth.

According to some embodiments, the electronic device may include a part of a furniture or building/structure having a communication function, an electronic board, an electronic signature receiving device, a projector, and various measuring instruments (for example, a water, electricity, gas, or electric wave measuring device).

The electronic device according to various embodiments of the present disclosure may be one of the above-listed devices or a combination thereof. It will be obvious to those of ordinary skill in the art that the electronic device according to various embodiments of the present disclosure is not limited to the above-listed devices.

A method and apparatus proposed in an embodiment of the present disclosure are applicable to various communication systems such as an Institute of Electrical and Electronics Engineers (IEEE) 802.11 communication system, an IEEE 802.16 communication system, a digital multimedia broadcasting (DMB) service, a digital video broadcasting-handheld (DVB-H) service, and a mobile broadcasting service such as an Advanced Television Systems Committee-Mobile/Handheld (ATSC-M/H) service, a digital video broadcasting system such as an Internet protocol television (IPTV) service, an Moving Picture Experts Group (MPEG) media transport (MMT) system, an evolved packet system (EPS), an Long Term Evolution (LTE) communication system, an LTE-Advanced (LTE-A) communication system, a high-speed downlink packet access (HSDPA) mobile communication system, a high-speed uplink packet access (HSUPA) mobile communication system, a 3rd-Generation (3G) Project Partnership 2 (3GPP2) high rate packet data (HRPD) mobile communication system, a 3GPP2 wideband code division multiple access (WCDMA) mobile communication system, a 3GPP2 code division multiple access (CDMA) mobile communication system, a mobile Internet protocol (IP), and so forth.

FIG. 1 illustrates an example of encryption of plaintext multimedia content.

Referring to FIG. 1, plaintext multimedia content including a plurality of samples is encrypted with a predetermined media key. That is, the plurality of samples included in the plaintext multimedia content, e.g., S1 101, S2 103, S3 105, S4 107, and S5 109 are encrypted to M1* 111, M2* 113, M3* 115, M4* 117, and M5* 119, respectively, by using the media key.

Two encryption schemes, that is, a symmetric encryption scheme and an asymmetric encryption scheme may be used for the encryption. The symmetric encryption scheme means that encryption and decryption are performed using an identical media key, and the asymmetric encryption scheme means that different media keys are used for encryption and decryption. It is assumed that the symmetric encryption scheme is used in FIG. 1.

Figure 2:
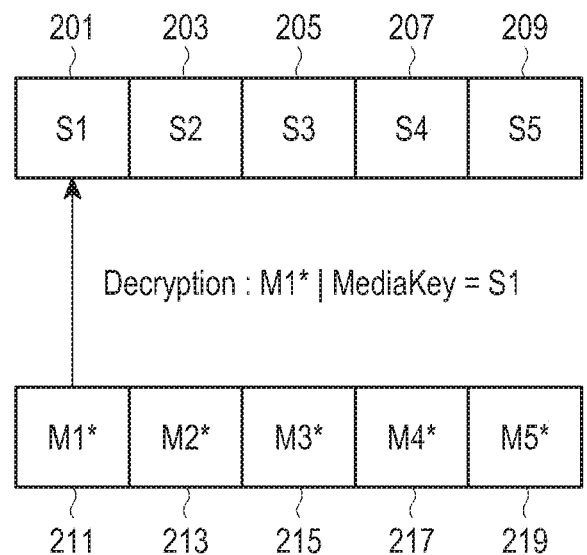
FIG. 2 illustrates an example of decryption of ciphertext multimedia content.

FIG. 2 illustrates an example of decryption of ciphertext multimedia content.

Referring to FIG. 2, ciphertext multimedia content including a plurality of samples are decrypted using a media key used for encryption of the ciphertext multimedia content. That is, a plurality of samples included in the ciphertext multimedia content, e.g., M1 211, M2 213, M3 215, M4 217, and M5 219 are decrypted to S1* 201, S2* 203, S3* 205, S4* 207, and S5* 209, respectively, by using the media key used for encryption of the ciphertext. It is assumed that the symmetric encryption scheme is used in FIG. 2.

The symmetric encryption scheme that performs encryption and decryption using the identical media key is economical because of high encryption speed and small volume due to its simple algorithm. However, the symmetric encryption has vulnerable security. That is, if the media key leaks, then the multimedia content leaks, and in this case, there is no way to identify who leaks the multimedia content.

Thus, a scheme that introduces a variant to some of samples included in the ciphertext multimedia content has been proposed. The variant is used to decrypt the ciphertext, and the variant is set differently according to a license granted to users. The multimedia content decrypted using the variant differs from user to user according to a combination of variants. Therefore, when a variant is introduced to the ciphertext multimedia content, users may be specified based on the decrypted multimedia content.

Figure 3:
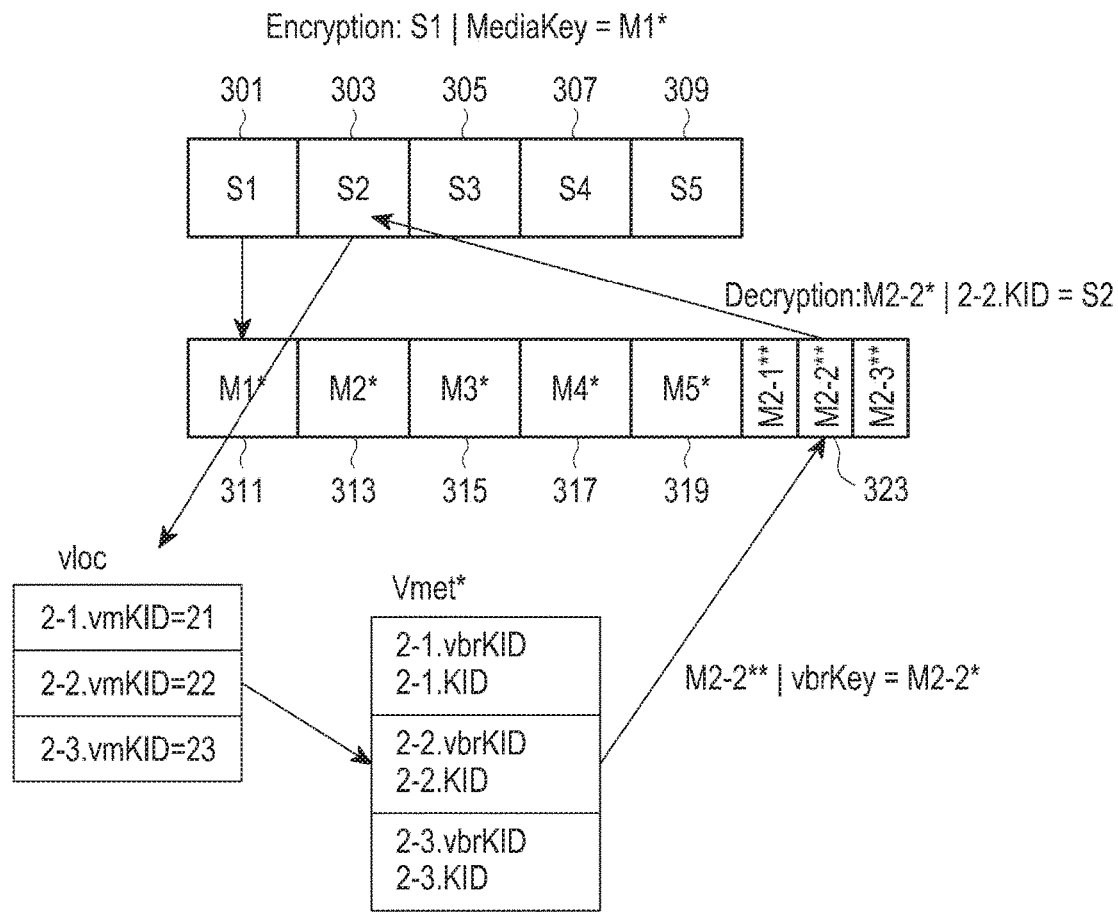
FIG. 3 illustrates an example where a variant is introduced to encryption and decryption of multimedia content.

FIG. 3 illustrates an example where a variant is introduced to encryption and decryption of multimedia content.

Referring to FIG. 3, plaintext multimedia content including a plurality of samples is encrypted with a predetermined media key.

In FIG. 3, it is assumed that the symmetric encryption scheme is used and the encrypted multimedia content includes encrypted samples and a plurality of variants. It is also assumed that a key identifier (KID) issued to a user A is 21, a KID issued to a user B is 22, and a KID issued to a user C is 23. The KID is a license granted to a user and is used to decrypt a variant.

A plurality of samples included in plaintext multimedia content, e.g., S1 301, S2 303, S3 305, S4 307, and S5 309 are encrypted to M1* 311, M2* 313, M3* 315, M4* 317, and M5* 319, respectively, by using a predetermined media key. The encrypted multimedia content further includes variants M2-1 321, M2-2 323, and M2-3 325** in addition to the encrypted samples M1* 311, M2* 313, M3* 315, M4* 317, and M5* 319.

To decrypt M2-2 323, the user B identifies a KID issued to the user B by referring to a variant location vloc. The user B identifying a KID 22 issued to the user B identifies a location of the variant M2-2 323 decryptable with the KID issued to the user B by referring to variant metadata Vmet*. The user B performs partial decryption with respect to M2-2 323** by using vbrKID included in Vmet*, such that M2-2 323** is partially decrypted to, e.g., M2-2*. Then, the user B performs full decryption with respect to the partially decrypted M2-2* by using the KID included in Vmet*, such that M2-2* is decrypted to, e.g., S2.

Figure 4A:
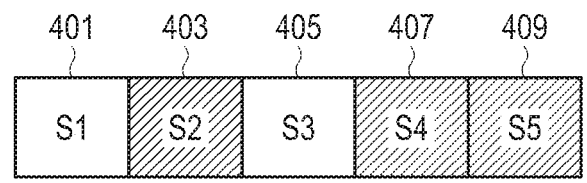
FIG. 4 illustrates an example where variants are configured for some of samples included in multimedia content.
Figure 4B:
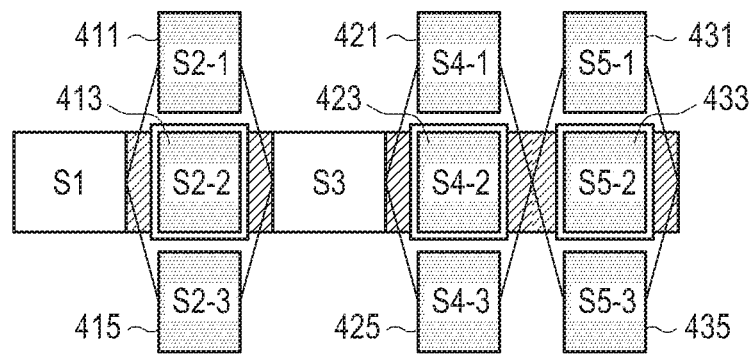

FIG. 4 illustrates an example where variants are configured for some of samples included in plaintext multimedia content.

Referring to FIG. 4, (a) illustrates plaintext multimedia content including samples S1 401 through S5 409, and (b) illustrates an example where variants are configured for samples S2 403, S4 407, and S5 409 among the samples S1 401 through S5 409. In (b), the sample S2 is configured with variants S2-1 411, S2-2 413, and S2-3 415, the sample S4 is configured with variants S4-1 421, S4-2 423, and S4-3 425, and the sample S5 is configured with variants S5-1 431, S5-2 433, and S5-3 435.

Assuming that multimedia content shown in (b) is decrypted multimedia content, variants for the respective samples S2, S4, and S5 may implement various patterns based on combinations of the variants. The variant patterns implemented by the combinations of the variants may be used to track a user, and in case of leakage of the multimedia content, a person who leaks the multimedia content may be identified based on the variant patterns.

Each variant pattern may be implemented by a combination of one of S2-1 411, S2-2 413, and S2-3 415 and one of S5-1 431, S5-2 433, and S5-3 435, and in this case, a total of 27 variant patterns may be implemented. In the following embodiment of the present disclosure, variant patterns implemented in this way will be expressed by arranging combined variants, and for convenience, a variant pattern will be expressed merely by an index of each sample. According to a variant pattern expression method of the present disclosure, for example, a variant pattern S2-1 411-S4-1 421-S5-2 433 is expressed like (1-1-2), a variant pattern S2-3 415-S4-1 421-S5-1 431 is expressed like (3-1-1), and a variant pattern S2-1 411-S4-1 421-S5-1 431 is expressed like (1-1-1).

Figure 5:
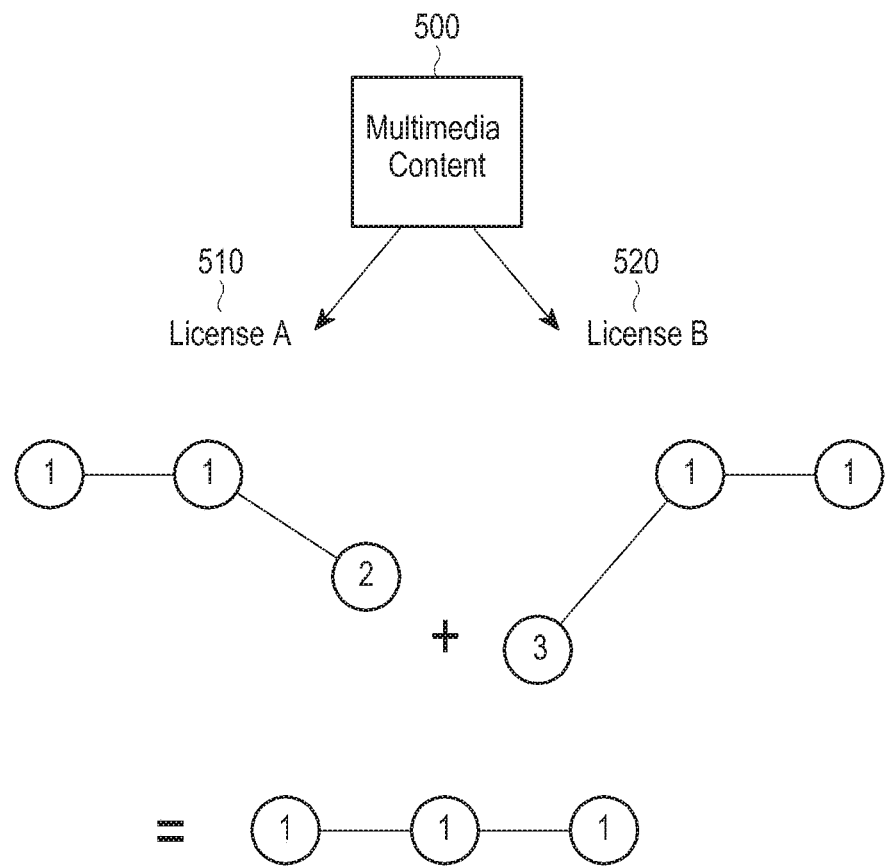
FIG. 5 illustrates an example where a new variant pattern is generated by mixing variant patterns of multimedia content decrypted with two different licenses.

FIG. 5 illustrates an example where a new variant pattern is generated by mixing variant patterns of multimedia content decrypted with two different licenses.

Referring to FIG. 5, ciphertext multimedia content 500 is assumed to be decrypted according to a license A 510 and a license B 520. It is assumed that a variant pattern of the multimedia content decrypted according to the license A 510 is (1-1-2), and a variant pattern of the multimedia content decrypted according to the license B 520 is (3-1-1).

In this case, a hacker may know which samples among samples included in multimedia content are configured as variants, and variant patterns decrypted with two different licenses may be mixed to generate a new variant pattern. That is, the hacker may mix the variant pattern (1-1-2) with the variant pattern (3-1-1) to generate a new variant pattern (1-1-1).

In this case, assuming that a variant pattern of multimedia content decrypted according to a license C is the same as the variant pattern (1-1-1) generated by the hacker, the user granted with the license C may be misunderstood as the hacker who leaks the multimedia content. As a result, the hacker may escape from pursuit.

Thus, the following description of the present disclosure will provide a scheme for configuring a variant to prevent the hacker from escaping from pursuit, if variant patterns decrypted with two different licenses are mixed to falsify media content.

Figure 6:
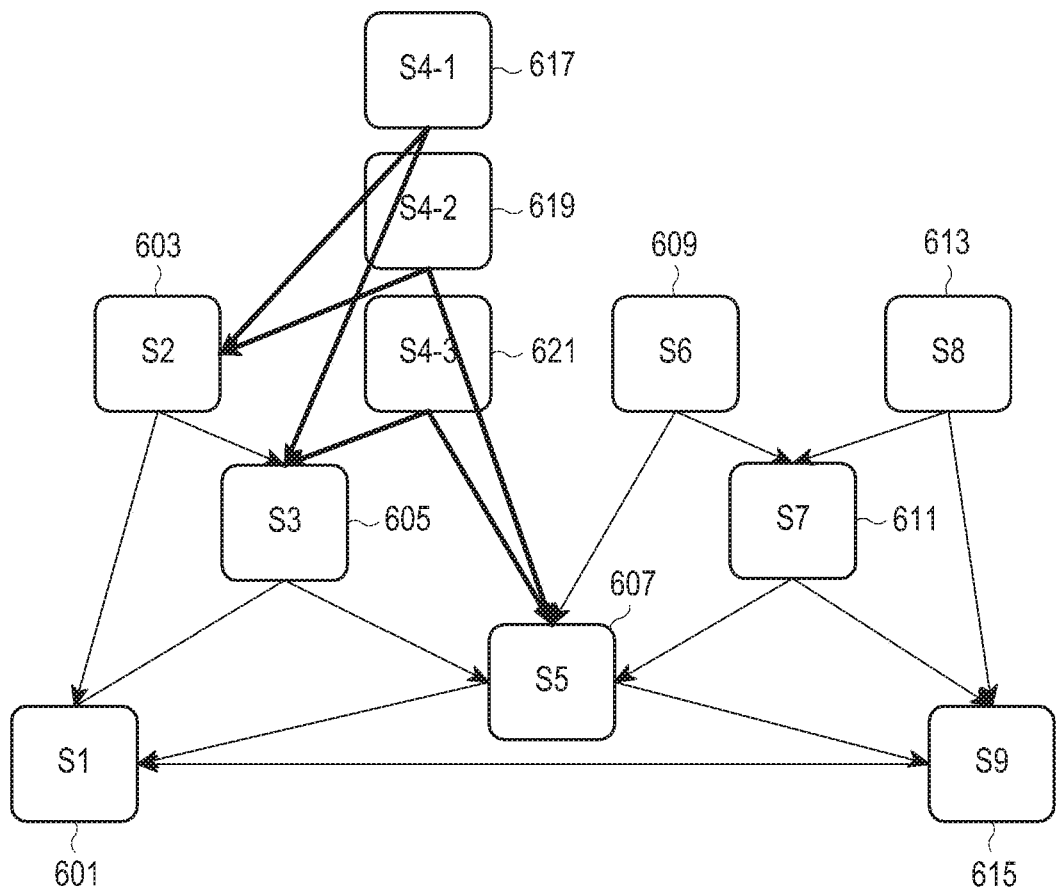
FIG. 6 illustrates an example where variants for samples included in multimedia content are configured according to an embodiment of the present disclosure.

FIG. 6 illustrates an example where variants for samples included in multimedia content are configured according to an embodiment of the present disclosure.

Referring to FIG. 6, multimedia content is assumed to include samples S1 601 through S9 615.

A sample S5 607 is configured with reference to the samples S1 601 and S9 615, a sample S3 605 is configured with reference to the samples S1 601 and S5 607, a sample S7 611 is configured with reference to the samples S5 607 and S9 615, a sample S6 609 is configured with reference to the samples S5 607 and S7 611, and a sample S8 613 is configured with reference to the samples S7 611 and S9 615.

Variants S4-1 617, S4-2 619, and S4-3 621 for a sample S4 are configured with reference to different samples. That is, the variant S4-1 617 is configured with reference to the samples S2 603 and S3 605, the variant S4-2 619 is configured with reference to the samples S2 603 and S5 607, and the variant S4-3 621 is configured with reference to the samples S3 605 and S5 607. As such, by configuring the variants S4-1 617, S4-2 619, and S4-3 621 with different combinations of samples referred to, when the variants S4-1 617, S4-2 619, and S4-3 are decrypted, bitstreams have different characteristics even though the decrypted samples look identical visually.

Figure 7:
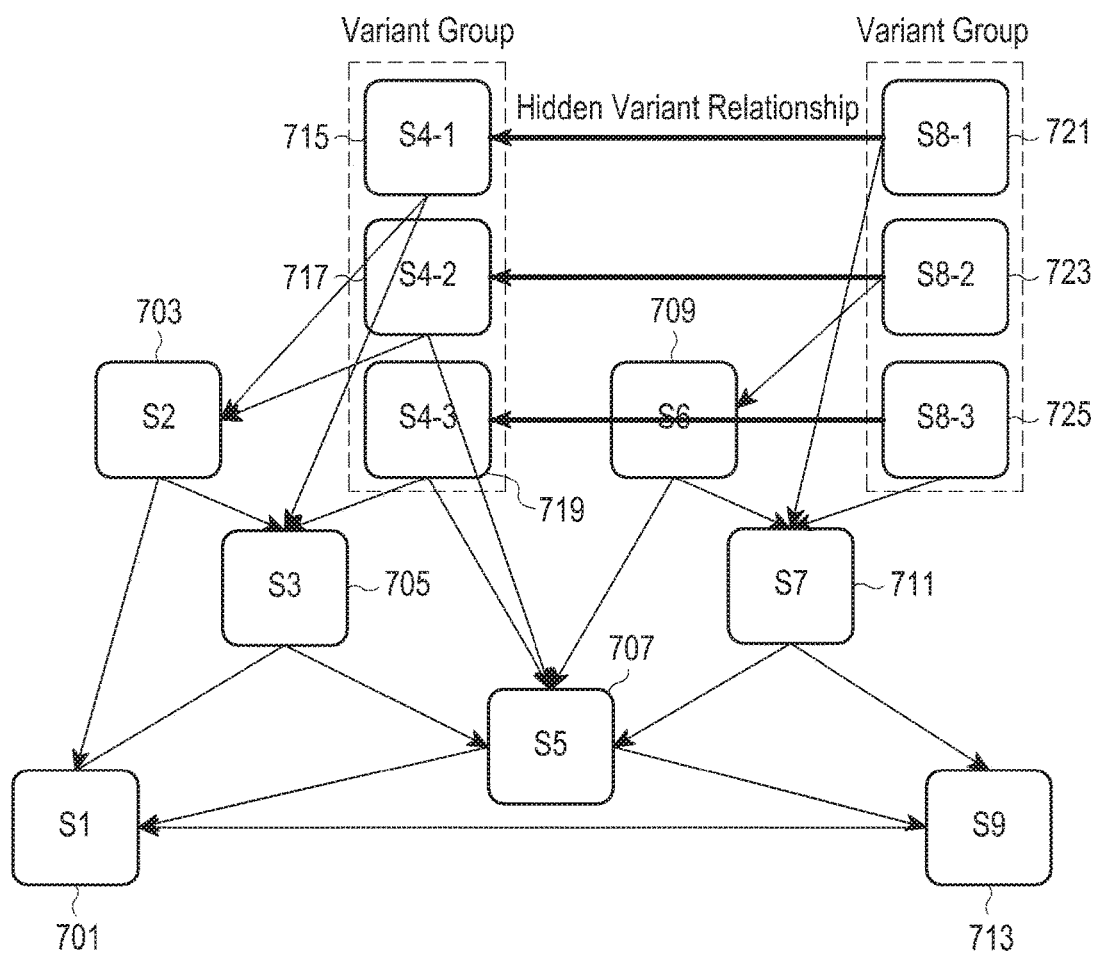
FIG. 7 illustrates an example where variants for samples included in multimedia content are configured according to another embodiment of the present disclosure.

FIG. 7 illustrates an example where variants for samples included in multimedia content are configured according to an embodiment of the present disclosure.

Referring to FIG. 7, multimedia content is assumed to include samples S1 701 through S9 713.

A sample S5 707 is configured with reference to the samples S1 701 and S9 713, a sample S3 705 is configured with reference to the samples S1 701 and S5 707, a sample S7 711 is configured with reference to the samples S5 707 and S9 713, and a sample S6 709 is configured with reference to the samples S5 707 and S7 711.

That is, the variant S4-1 715 for the sample S4 is configured with reference to the samples S2 703 and S3 705, the variant S4-2 717 is configured with reference to the samples S2 703 and S5 707, and the variant S4-3 719 is configured with reference to the samples S3 705 and S5 707. Hereinbelow, a group of a plurality of variants configured for a particular sample will be referred to as a variant group. That is, the variants S4-1 715, S4-2 707, and S4-3 719 belong to a variant group for the sample S4.

The variants S4-1 715, S4-2 707, and S4-3 719 belonging to the variant group for the sample S4 may be referred to by variants belonging to a variant group for another sample. That is, a variant S8-1 721 for a sample S8 is configured with reference to the variant S4-1 715 and the sample S7 711, a variant S8-2 723 is configured with reference to the variant S4-2 717 and the sample S6 709, and a variant S8-3 725 is configured with reference to the variant S4-3 719 and the sample S7 711.

As such, the variants S8-1 721, S8-2 723, and S8-3 725 are configured with reference to the variants S4-1 715, S4-2 707, and S4-3 719, respectively. Hereinbelow, a relationship where a variant belonging to a particular variant group refers to a variant belonging to another variant group will be called a hidden variant relationship. That is, the variants S8-1 721, S8-2 723, and S8-3 725 are configured with reference to the variants S4-1 715, S4-2 717, and S4-3 719, respectively.

The variants S8-1 721, S8-2 723, and S8-3 725 may freely refer to variants belonging to different variant groups, respectively, but may not overlappingly refer to a particular variant belonging to the another variant group. For example, the variants S8-1 721 and S8-2 723 may not overlappingly refer to the identical variant S4-1 715. In this way, variants belonging to different variant groups, e.g., the variants S4-1 715, S4-2 717, and S4-3 719 may be referred to by the variants S8-1 721, S8-2 723, and S8-3 725, respectively, only once.

Figure 8:
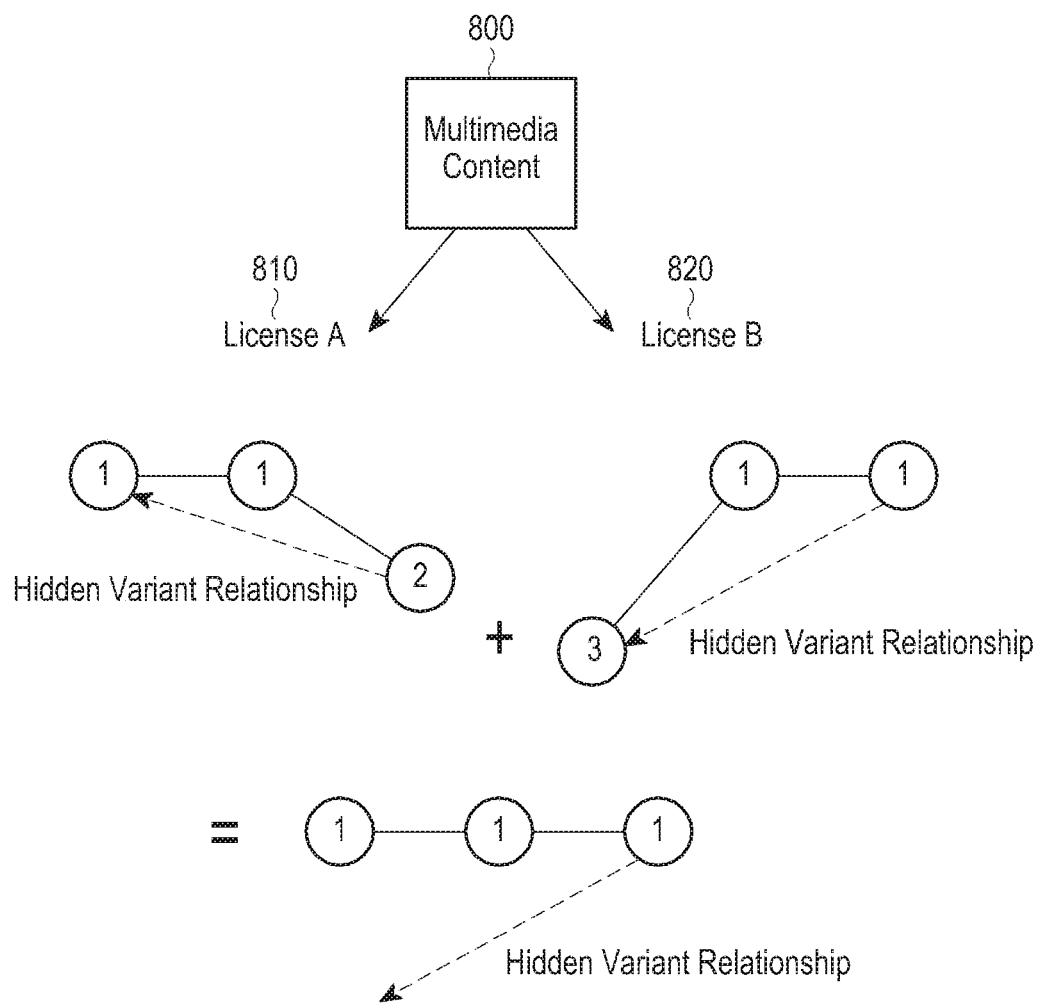
FIG. 8 illustrates an example where a new variant pattern is generated by mixing variant patterns that form a secret variant relationship.

FIG. 8 illustrates an example where a new variant pattern is generated by mixing variant patterns that form a secret variant relationship.

Referring to FIG. 8, ciphertext multimedia content 800 is assumed to be decrypted according to a license A 810 and a license B 820. It is assumed that a variant pattern of the multimedia content decrypted according to the license A 810 is (1-1-2), and a variant pattern of the multimedia content decrypted according to the license B 520 is (3-1-1).

If a variant pattern is implemented with a combination of one of variants 1-1, 1-2, and 1-3 for a sample S1, one of variants 2-1, 2-2, and 2-3 for a sample S2, and one of variants 3-1, 3-2, and 3-3 for a sample S3, the variant 3-2 that implements a variant pattern of multimedia content decrypted according to a license A 810 is assumed to form a hidden variant relationship with the variant 1-1. It is also assumed that the variant 3-1 that implements a variant pattern of multimedia content decrypted according to a license B 820 forms a hidden variant relationship with the variant 1-3.

In this case, a hacker may know which samples among samples included in multimedia content are configured as variants, and variant patterns decrypted with two different licenses may be mixed to generate a new variant pattern. That is, the hacker may mix the variant pattern (1-1-2) with the variant pattern (3-1-1) to generate a new variant pattern (1-1-1).

However, the variant 3-1 that implements the variant pattern (1-1-1) generated by the hacker has a wrong reference relationship as shown in the drawing, resulting in image distortion, etc., during reproduction of related multimedia content. Moreover, in spite of no visual problem, bitstreams may be configured differently. That is, the variant 3-1 has a hidden variant relationship with the variant 1-3, but the variant pattern (1-1-1) generated by the hacker has a wrong reference relationship because the variant 3-1 does not refer to the variant 1-3.

Thus, the apparatus for detecting falsification of media content may detect that a reference relationship of the variant 3-1 is wrong. The apparatus may also recognize that the variant 1-1 that implements the variant pattern (1-1-1) is one of variants that configure a variant pattern decrypted according to the license A 810. In this case, even if assuming that the variant pattern of the multimedia content decrypted according to the license C is the same as the variant pattern (1-1-1) generated by the hacker, the apparatus may recognize that the user granted with the license C is not the hacker who leaks the multimedia content.

Figure 9:
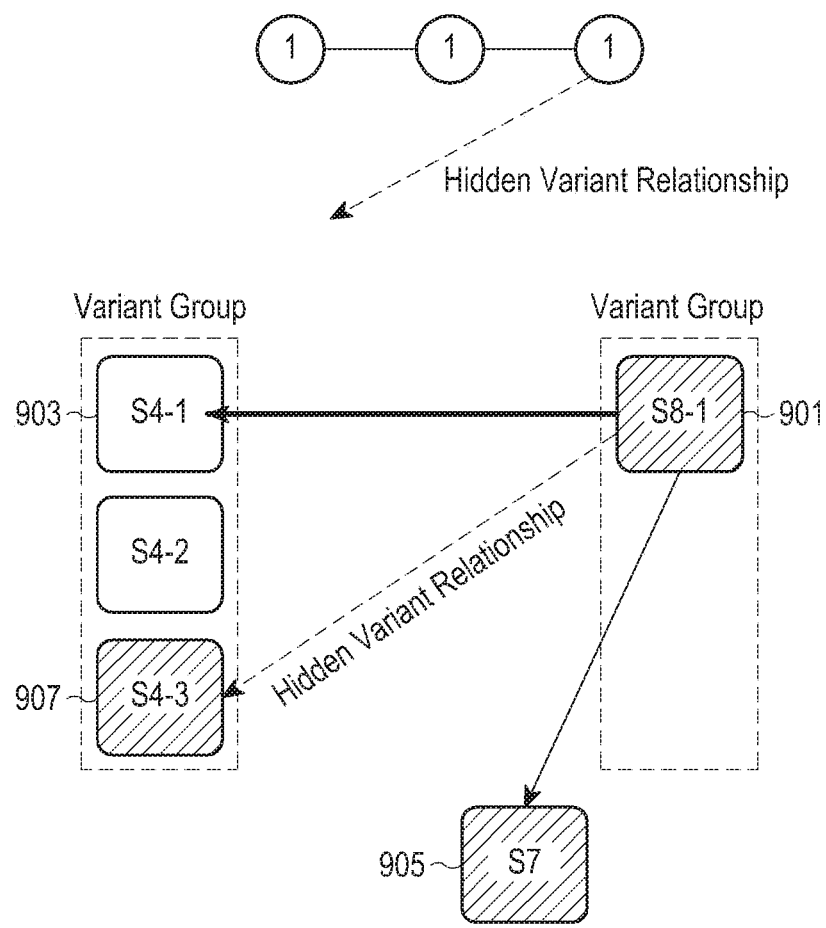
FIG. 9 illustrates an example where a decryption device decrypts a variant that forms a secret variant relationship.

FIG. 9 illustrates an example where a decryption device decrypts a variant that forms a secret variant relationship.

Referring to FIG. 9, it is assumed that a variant S8-1 901 is configured with reference to a variant S4-1 903 and a sample S7 905 and the variant S8-1 901 forms a hidden variant relationship with the variant S4-3 907.

The decryption device uses a result of the sample S4 having a reference relationship for decrypting the variant S8-1 901, that is, a decrypted picture. The variant S8-1 901 that implements the variant pattern (1-1-1) refers to the variant S4-1 903, but forms a secret variant relationship with the variant S4-3 907, such that the decryption device decrypts the variant S8-1 901 by referring to the variant S4-3 907 and the sample S7 905.

However, the decrypted picture of the variant S4-1 903 and the decrypted picture of the variant S4-3 907 have referred to different pictures, and thus bitstreams thereof are also different. Moreover, the decrypted picture of the variant S8-1 901 decrypted referring to the variant S4-1 903 and the sample S7 905 and the decrypted picture of the variant S8-1 901 decrypted referring to the variant S4-3 907 and the sample S7 905 are also different.

Figure 10:
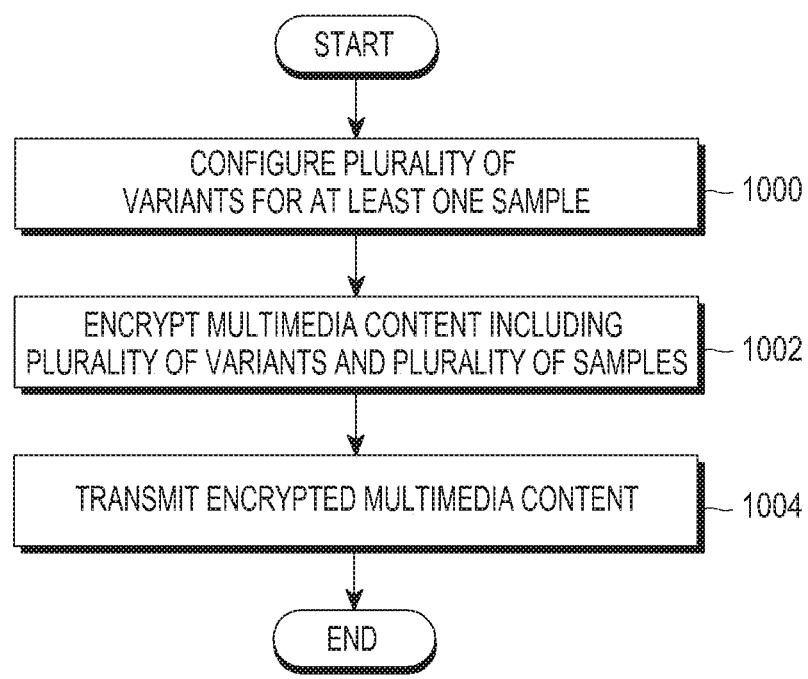
FIG. 10 is a flowchart illustrating a method, performed by an encryption device, for encrypting multimedia content according to an embodiment of the present disclosure.

FIG. 10 is a flowchart illustrating a method, performed by an encryption device, for encrypting multimedia content according to an embodiment of the present disclosure.

Referring to FIG. 10, in operation 1000, the encryption device configures a plurality of variants for at least one of samples included in transmitted multimedia content. In operation 1002, the encryption device encrypts the multimedia content including the plurality of variants and the plurality of samples.

In operation 1004, the encryption device transmits the multimedia content encrypted in operation 1002.

Figure 11:
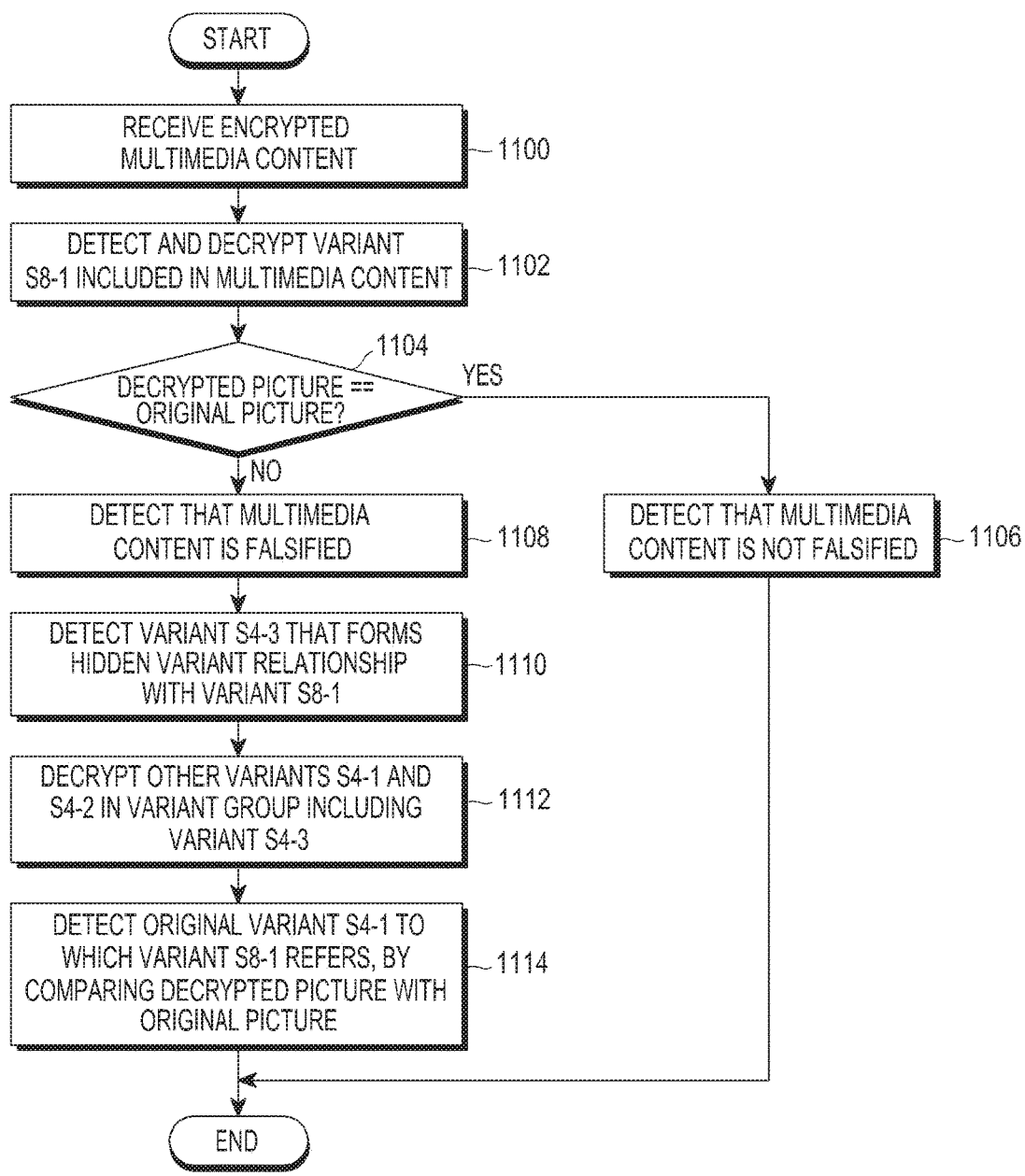
FIG. 11 is a flowchart illustrating a method, performed by a decryption device, for decrypting multimedia content according to an embodiment of the present disclosure.

FIG. 11 is a flowchart illustrating a method, performed by a decryption device, for decrypting multimedia content according to an embodiment of the present disclosure.

Referring to FIG. 11, in operation 1100, a decryption device receives encrypted multimedia content. In operation 1102, the decryption device detects and decrypts one of the variants included in the received multimedia content. Herein, the detected variant is assumed to have been configured with reference to one variant and one sample, and may be, for example, the variant S8-1 of FIG. 9.

In operation 1104, the decryption device compares a decrypted picture, that is, a picture related to the decrypted variant S8-1 with the original picture before being encrypted, and if the picture related to the decrypted variant is the same as the original picture before being encrypted, the decryption device goes to operation 1106. In operation 1106, the decryption device detects that the multimedia content received in operation 1100 has not been falsified.

If the picture related to the decrypted variant is not the same as the original picture before being encrypted in operation 1104, the decryption device goes to operation 1108. In operation 1108, the decryption device detects that the multimedia content received in operation 1100 has been falsified. If the decryption device detects that the multimedia content has been falsified, it is reasonable that there exists at least one license used for leakage of the multimedia content.

In operation 1110, the decryption device detects a variant that forms a secret variant relationship with the variant S8-1 detected in operation 1102. The variant that forms the secret variant relationship with the variant S8-1 may be, for example, the variant S4-3 of FIG. 9.

In operation 1112, the decryption device decrypts other variants S4-1 and S4-2 in the variant group including the variant S4-3. In operation 1114, the decryption device compares a picture related to each of the decrypted variants S4-1 and S4-2 with the original picture before being encrypted to detect the original variant S4-1 to which the variant S8-1 refers.

Meanwhile, FIGS. 10 and 11 illustrate operation processes of the encryption device and the decryption device, and various modifications may be made to FIGS. 10 and 11. For example, consecutive operations are shown in FIGS. 10 and 11, but those operations described with FIGS. 10 and 11 may overlap, may be performed in parallel, may be performed in different orders, or may be performed multiple times.

Figure 12:
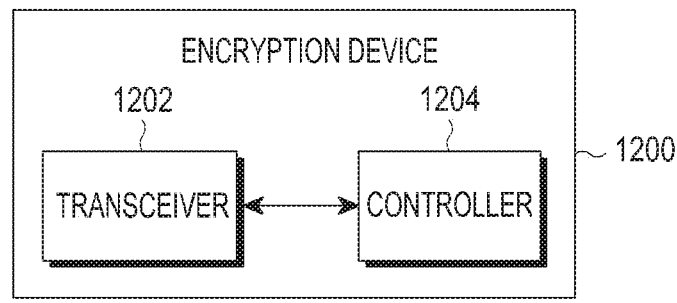
FIG. 12 is a block diagram illustrating an internal structure of an encryption device that encrypts multimedia content according to an embodiment of the present disclosure.

FIG. 12 is a block diagram illustrating an internal structure of an encryption device 1200 that encrypts multimedia content according to an embodiment of the present disclosure.

Referring to FIG. 12, the illustrated encryption device 1200 may include a transceiver 1202 and a controller 1204.

The controller 1204 controls an overall operation of the encryption device 1200. In particular, the controller 1204 controls an overall operation related to encryption according to an embodiment of the present disclosure. Herein, the overall operations related to encryption are the same as those described above with reference to FIGS. 3 through 10, and thus will not be described in detail at this time.

The transceiver 1202 transmits various messages under control of the controller 1204. Herein, various messages transmitted by the transceiver 1202 are the same as those described above with reference to FIGS. 3 through 10, and thus will not be described in detail at this time.

Figure 13:
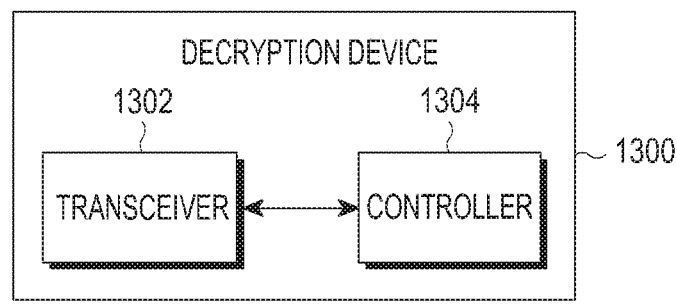
FIG. 13 is a block diagram illustrating an internal structure of a decryption device that decrypts encrypted multimedia content according to an embodiment of the present disclosure.

FIG. 13 is a block diagram illustrating an internal structure of a decryption device 1300 that decrypts encrypted multimedia content according to an embodiment of the present disclosure.

Referring to FIG. 13, the illustrated decryption device 1300 may include a transceiver 1302 and a controller 1304.

The controller 1304 controls an overall operation of the decryption device 1300. In particular, the controller 1304 controls an overall operation related to decryption according to an embodiment of the present disclosure. Herein, the overall operations related to decryption are the same as those described above with reference to FIGS. 3 through 9, and FIG. 11, and thus will not be described in detail at this time.

The transceiver 1302 transmits various messages under control of the controller 1304. Herein, various messages transmitted by the transceiver 1302 are the same as those described above with reference to FIGS. 3 through 9 and FIG. 11, and thus will not be described in detail at this time.

While embodiments of the present disclosure have been described, various changes may be made without departing the scope of the present disclosure. Therefore, the scope of the present disclosure should be defined by the appended claims and equivalents thereof, rather than by the described embodiments.

The apparatus and method for encrypting and decrypting multimedia content according to an embodiment of the present disclosure may be implemented by hardware, software, or a combination of hardware and software. Such arbitrary software may be stored, for example, in a volatile or non-volatile storage device (e.g., a ROM, etc.), a memory (e.g., a RAM, a memory chip, a memory device, or a memory IC), or a machine (e.g., computer) recordable optical or magnetic storage medium (e.g., a CD, a DVD, a magnetic disc, a magnetic tape, etc.) regardless of its ability to erase or rewrite. It can be seen that the graphic screen update method according to the present disclosure may be implemented by a computer or a portable terminal which includes a controller and a memory, and the memory is an example of a machine-readable storage medium which is suitable for storing a program or programs including instructions for implementing the embodiment of the present disclosure.

Accordingly, the present invention includes a program that includes a code for implementing the apparatus and method set forth in the appended claims of the specification and a machine (computer, etc.) readable storage medium for storing the program. Furthermore, the program may be electronically transferred by an arbitrary medium, such as a communication signal transmitted through a wired or wireless connection, and the present invention appropriately includes equivalents of the program.

In addition, the apparatus for encrypting and decrypting multimedia content according to the embodiment of the present invention, may receive the program from a program providing device that is connected thereto in a wired or wireless manner, and may store the received program. The program providing device may include a memory for storing a program including instructions for instructing the graphic processing apparatus to execute a preset method, information necessary for the method, a communication unit for performing wired or wireless communication with the graphic processing apparatus, and a controller for transmitting a corresponding program to the graphic processing apparatus at the request of the apparatus or automatically.

The invention claimed is:

1. A method for transmitting multimedia content, the method comprising:
   encrypting a plurality of samples using a first key;
   generating one or more variants by encrypting one or more encrypted samples among a plurality of encrypted samples using a second key and a third key; and
   transmitting the multimedia content including the one or more variants and the plurality of encrypted samples,
   wherein the one or more variants, respectively, are configured with reference to one or more samples among the plurality of samples, and the one or more samples are different for each of the one or more variant.

2. The method of claim 1, wherein the plurality of samples comprise a first sample and a second sample, and the one or more variants configured for the first sample is configured with reference to the one or more variants configured for the second sample, and each of the one or more variants configured for the second sample is referred to by the one or more variants configured for the first sample once.

3. The method of claim 2, wherein bitstreams respectively generated for the one or more variants are different from each other.

4. The method of claim 1, further comprising:
   implementing a variant pattern by combining one variant selected from among the one or more variants configured for a first sample with one variant selected from among the one or more variants configured for a second sample,
   wherein the plurality of samples comprise the first sample and the second sample.

5. An apparatus for encrypting multimedia content, the apparatus comprising:
   a controller configured to:
      encrypt a plurality of samples using a first key, and
      generate one or more variants by encrypting one or more encrypted samples among a plurality of encrypted samples using a second key and a third key, and
   a transceiver configured to transmit the multimedia content including the one or more variants and the plurality of encrypted samples, wherein the one or more variants, respectively, are configured with reference to one or more samples among the plurality of samples, and the one or more samples are different for each of the one or more variant.

6. The apparatus of claim 5, wherein the plurality of samples comprise a first sample and a second sample, and the one or more variants configured for the first sample is configured with reference to the one or more variants configured for the second sample, and each of the one or more variants configured for the second sample is referred to by the one or more variants configured for the first sample once.

7. The apparatus of claim 6, wherein bitstreams respectively generated for the one or more variants are different from each other.

8. The apparatus of claim 5,
wherein the plurality of samples comprise a first sample and a second sample, and
wherein the controller is further configured to implement a variant pattern by combining one variant selected from among the one or more variants configured for the first sample with one variant selected from among the one or more variants configured for the second sample.

* * * * *